United States Patent
Dai et al.

(10) Patent No.: US 8,520,660 B2
(45) Date of Patent: Aug. 27, 2013

(54) METHOD AND APPARATUS OF SENDING SYNCHRONIZATION SIGNALS IN TDD SYSTEMS

(75) Inventors: Bo Dai, Shenzhen (CN); Shuqiang Xia, Shenzhen (CN); Peng Hao, Shenzhen (CN); Chunli Liang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 377 days.

(21) Appl. No.: 12/811,706

(22) PCT Filed: Nov. 6, 2008

(86) PCT No.: PCT/CN2008/072971
§ 371 (c)(1),
(2), (4) Date: Jul. 5, 2010

(87) PCT Pub. No.: WO2009/094877
PCT Pub. Date: Aug. 6, 2009

(65) Prior Publication Data
US 2010/0278081 A1    Nov. 4, 2010

(30) Foreign Application Priority Data
Jan. 25, 2008    (CN) .......................... 2008 1 0008593

(51) Int. Cl.
*H04J 3/06*    (2006.01)

(52) U.S. Cl.
USPC ......................................... 370/350

(58) Field of Classification Search
USPC ................... 370/328–339, 350, 503–510
See application file for complete search history.

(56) References Cited

U.S. PATENT DOCUMENTS

| 7,693,123 B2 * | 4/2010 | Rudolf ........................... 370/342 |
| 2003/0133431 A1 | 7/2003 | Rudolf |
| 2009/0129298 A1 * | 5/2009 | Luo et al. ....................... 370/280 |
| 2009/0180435 A1 * | 7/2009 | Sarkar ........................... 370/330 |

FOREIGN PATENT DOCUMENTS

| CN | 1996791 A | 7/2007 |
| CN | 101035371 A | 9/2007 |
| CN | 101102148 A | 1/2008 |
| CN | 101222274 A | 7/2008 |
| CN | 101911796 A | 12/2010 |
| RU | 94045960 | 12/1997 |
| RU | 2124810 | 1/1999 |
| RU | 2235430 | 8/2004 |

(Continued)

OTHER PUBLICATIONS

Supplementary European Search Report in European application No. 08872015.6, mailed on Apr. 14, 2011.

(Continued)

*Primary Examiner* — Frank Duong
(74) *Attorney, Agent, or Firm* — Neifeld IP Law, PC

(57) ABSTRACT

The present invention discloses a method and apparatus of sending synchronization signals in TDD systems. The method includes: sending P-SCH signals of synchronization signals on the third symbol of a DwPTS; sending S-SCH signals of the synchronization signals on the last OFDM symbols of time slot 1 and time slot 11. The present invention solves the problem that the P-SCH signal sending interferes with the pilot sending of the first and second antenna in the prior art, guarantees that the location of the pilot in the DwPTS does not change, and reduces the system complexity.

4 Claims, 6 Drawing Sheets

(56) References Cited

FOREIGN PATENT DOCUMENTS

| WO | WO 9419877 | 9/1994 |
| WO | 03047117 A2 | 6/2003 |
| WO | WO 2009089287 | 7/2009 |

OTHER PUBLICATIONS

Ericsson. "On the design of DwPTS", Document for Discussion, Agenda Item 6.1.7, Sorrento, Italy, Feb. 11-15, 2008.

CMCC et al., "Way Forward on LTE TDD Frame Structure", Document for Discussion and Decision, Agenda Item 6.1, Jeju, Korea, Nov. 5-9, 2007.

ZTE, Synchronization in Backhaul Link, Document for Discussion, Agenda Item 7.5.2, San Francisco, USA, Feb. 22-26, 2010.

International Search Report in international application No. PCT/CN2008/072971, mailed on Feb. 12, 2009.

English Translation of the Written Opinion of the International Search Authority in international application No. PCT/CN2008/072971, mailed on Feb. 12, 2009.

\* cited by examiner

METHOD AND APPARATUS OF SENDING SYNCHRONIZATION SIGNALS IN TDD SYSTEMS

TECHNICAL FIELD

The present invention relates to the field of communications, specifically to a method and apparatus of sending synchronization signals in time division duplex (TDD) systems.

BACKGROUND

A TDD frame structure in a long term evolution (LTE) system is shown in FIG. 1. In such frame structure, a 10 ms radio frame is divided into two half-frames, each of which is divided into ten time slots equally of a length of 0.5 ms, and every two time slots forms a 1 ms sub-frame, thus the radio frame includes ten sub-frames (numbered from 0 to 9) and the radio frame includes twenty time slots (numbered from 0 to 19). For a normal cyclic prefix (CP) of a length of 5.21 us and 4.69 us, one time slot includes seven uplink/downlink symbols equally of a length of 66.7 us, wherein the cyclic prefix length of the first symbol is 5.21 us, and the cyclic prefix length of each of other six symbols is 4.69 us; for an extended cyclic prefix of a length of 16.67 us, one time slot includes six uplink/downlink symbols. Additionally, in such frame structure, the configuration of the sub-frame possesses features as following.

Sub-frame 0 and sub-frame 5 are fixedly used for downlink transmission.

Uplink/downlink switching with a period of 5 ms and 10 ms is supported.

Sub-frame 1 and sub-frame 6 are special sub-frames, which are used to transmit three special time slots that are a downlink pilot time slot (DwPTS), a guard period (GP), and an uplink pilot time slot (UpPTS), wherein, the DwPTS is used for downlink transmission;

the GP is guard time, and is not used to transmit any data; and

UpPTS is used for uplink transmission, at least including 2 uplink single carrier-frequency division multiple access (SC-FDMA) symbols, which are used to transmit physical random access channels (PRACH).

When the uplink/downlink switching with a period of 5 ms is implemented, sub-frame 2 and sub-frame 6 are fixedly used for uplink transmission.

When the uplink/downlink switching with a period of 10 ms is implemented, the DwPTS is present in two half-frames, the GP and the UpPTS are present in the first half-frame, the length of the DwPTS in the second half-frame is 1 ms, and sub-frame 2 is used for uplink transmission, sub-frame 7 to sub-frame 9 are used for downlink transmission.

Primary-synchronization (P-SCH) signals are sent in the first orthogonal frequency division multiplexing (OFDM) symbol of the DwPTS; and secondary-synchronization (S-SCH) signals are sent in the last OFDM symbols of time slot 1 and time slot 11.

Pilots of the first and second antennas are sent in the first OFDM symbol and on the third OFDM symbol from the last in a time slot, and pilots of the third and forth antennas are sent in the second OFDM symbol in a time slot.

In view of that the P-SCH signal sending on the first OFDM symbol of the DwPTS interferes with the original pilot sending of the first and second antennas, it is required to redesign the pilot in the DwPTS, which will result in increase of system complexity.

SUMMARY

Considering the problem that it is required to redesign the pilot in the DwPTS because the P-SCH signal sending interferes with the original pilot sending of the first and second antennas, the invention is put forward to provide a method and apparatus of sending synchronization signals in TDD systems to solve the problem mentioned above.

According to an aspect of the present invention, a method of sending synchronization signals in TDD systems is provided, comprising: sending P-SCH signals of synchronization signals on the third symbol of a DwPTS; and sending S-SCH signals of the synchronization signals on the last OFDM symbols of time slot 1 and time slot 11.

According to another aspect of the present invention, a method of sending synchronization signals in TDD systems is provided, comprising: sending P-SCH signals of synchronization signals on the last OFDM symbols of time slot 1 and time slot 11; and sending S-SCH signals of the synchronization signals on the third symbol of a DwPTS.

According to yet another aspect of the present invention, an apparatus of sending synchronization signals in TDD systems is provided, comprising: a P-SCH signal module, which is used to send P-SCH signals of synchronization signals on the third symbol of a DwPTS; and an S-SCH signal module, which is used to send S-SCH signals of the synchronization signals on the last OFDM symbols of time slot 1 and time slot 11.

According to yet another aspect of the present invention, an apparatus of sending synchronization signals in TDD systems is provided, comprising: a P-SCH signal module, which is used to send P-SCH signals of synchronization signals on the last OFDM symbols of time slot 1 and time slot 11; and an S-SCH signal module, which is used to send S-SCH signals of the synchronization signals on the third symbol of a DwPTS.

By means of at least one of the technical schemes mentioned above, it will not be required to change the pilot design in the DwPTS, thus achieving the effects of reducing the system complexity and not influencing the performance of cell searching, because there is no pilot sent in the third symbol of the DwPTS, and there will be no influence on the pilot when sending synchronization signals on this symbol.

BRIEF DESCRIPTION OF THE DRAWINGS

The drawings described herein are used to provide further understanding of the present invention, and constitute a part of this application. The exemplary embodiments of the present invention and their descriptions are used for explaining the present invention, and do not constitute any inappropriate restriction on this invention. In the accompanying drawings.

DETAILED DESCRIPTION

Function Overview

In the technical schemes provided in embodiments of the present invention, by configuring a location for sending synchronization signals, i.e. by sending P-SCH signals on the third symbol of a DwPTS or on the last OFDM symbols of time slot 1 and time slot 11, it can be avoided that P-SCH signal sending interferes with original pilot sending of the first and second antennas.

The present invention will be described in detail with reference to the drawings and the embodiments hereinafter. It should be noted that, the embodiments in the present invention and the features in the embodiments can be combined with one another if no interference occurs.

Method Embodiment 1

Figure 1:
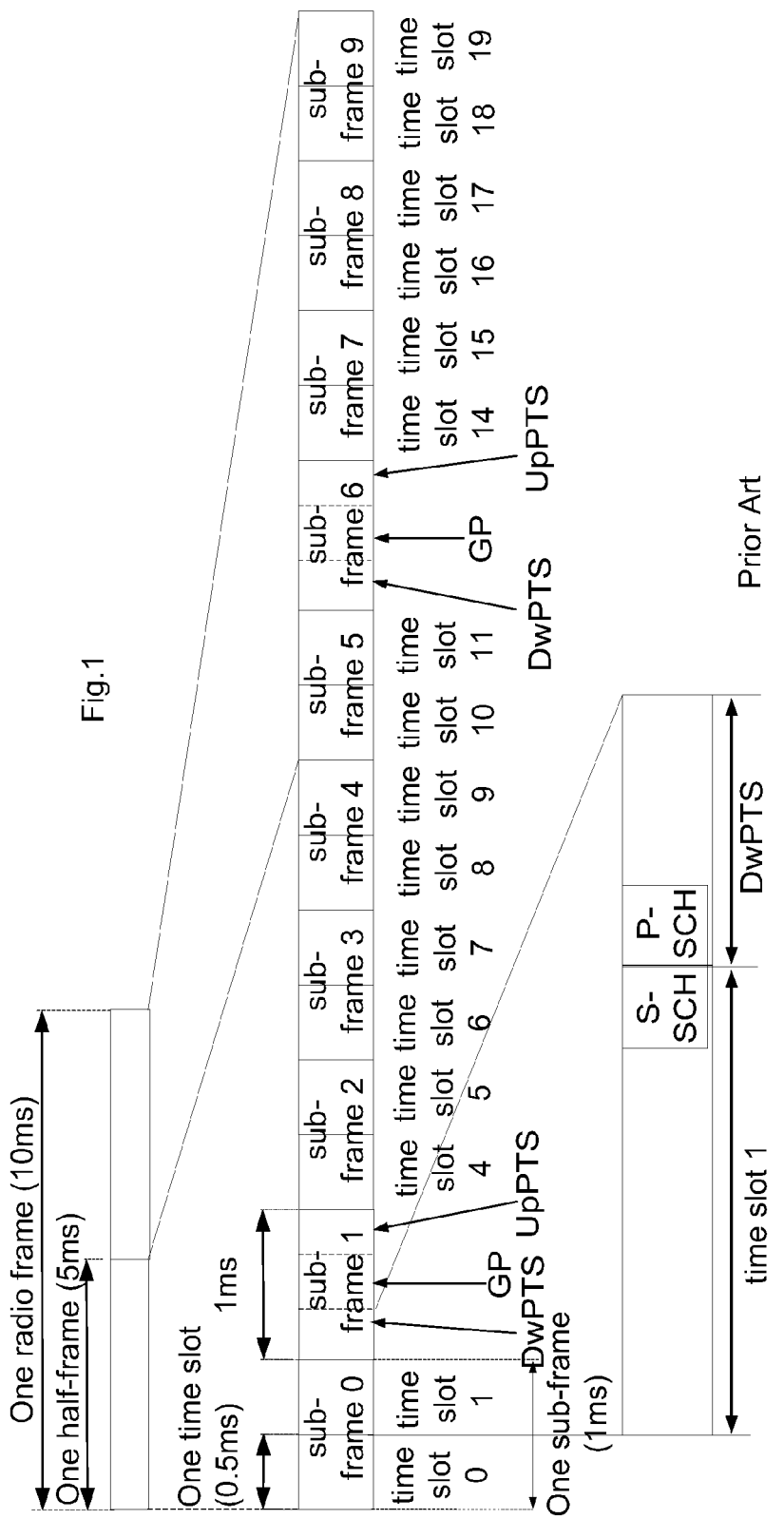
FIG. 1 is a schematic diagram of a frame structure in a LTE TDD system of relevant technologies.
Figure 2:
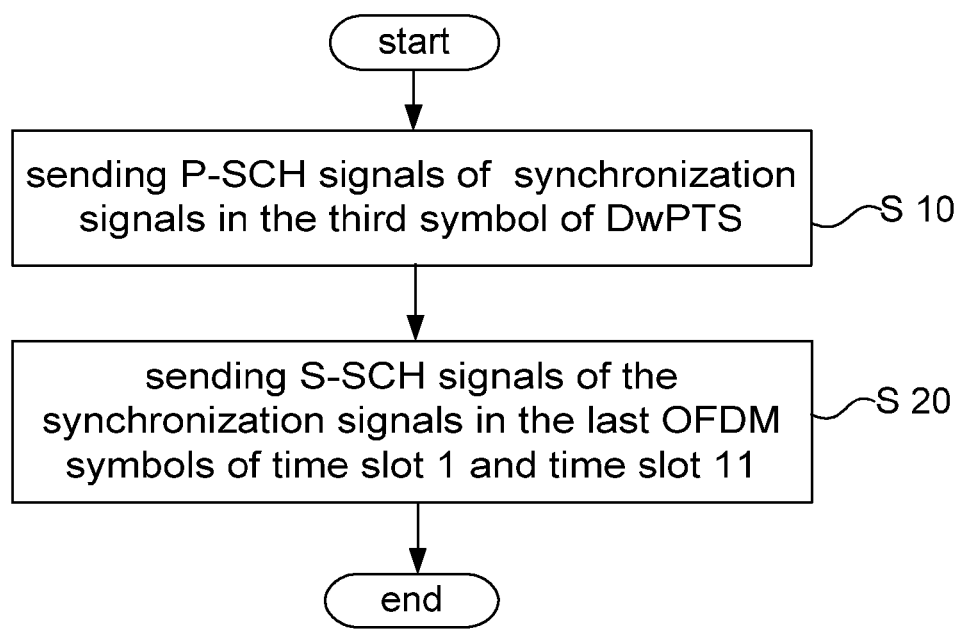
FIG. 2 is a flow chart of a method of sending synchronization signals according to Method Embodiment 1 of the present invention.

In this embodiment, a method of sending synchronization signals is provided. FIG. 2 is a flow chart of the method of sending synchronization signals of this embodiment. As shown in FIG. 2, the method comprises:

step S10: sending P-SCH signals of synchronization signals on the third symbol of the DwPTS; and step S20: sending S-SCH signals of the synchronization signals on the last OFDM symbols of time slot 1 and time slot 11.

Figure 3:
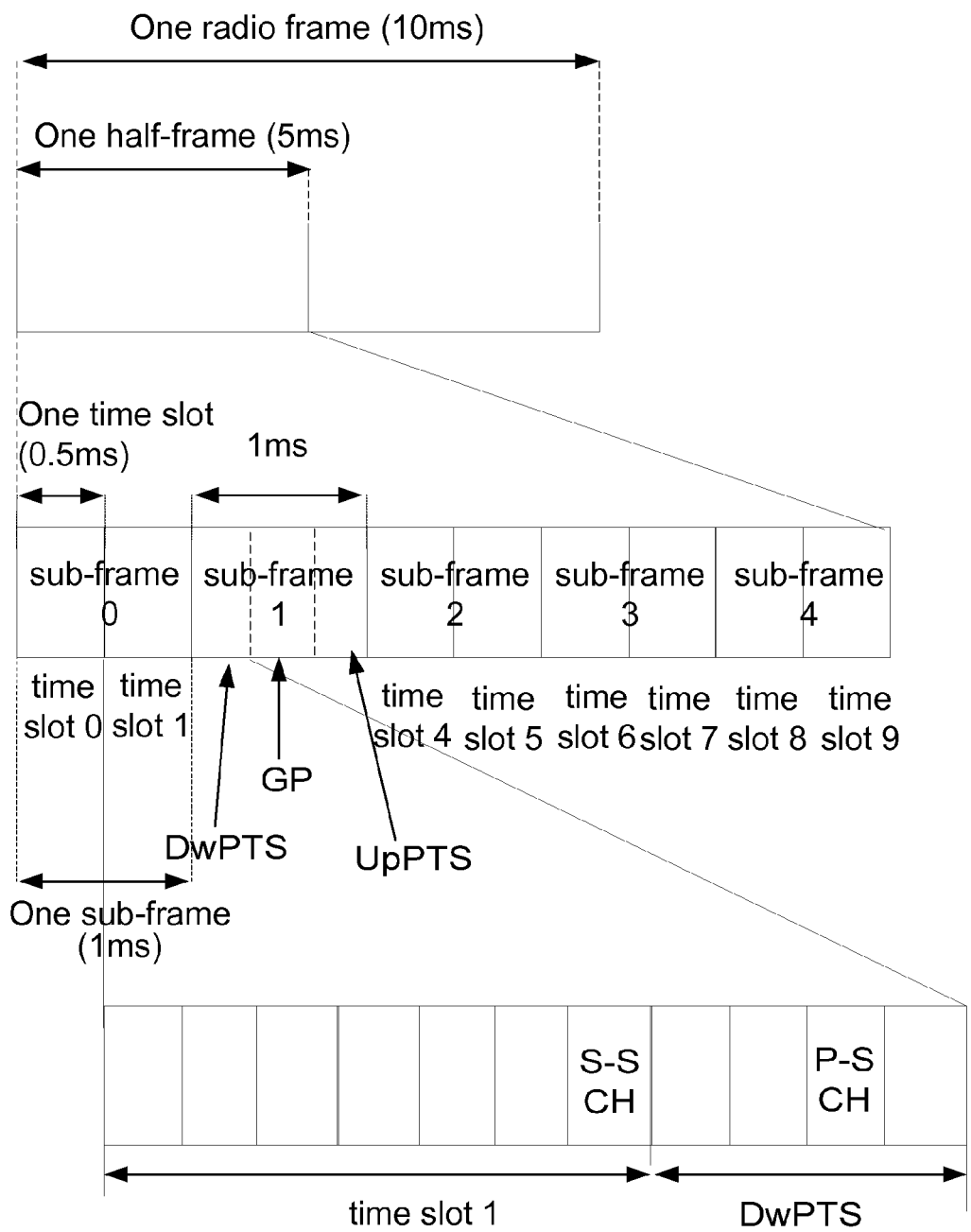
FIG. 3 is a schematic diagram of a frame structure of a method of sending synchronization signals according to Method Embodiment 1 of the present invention.

FIG. 3 is a schematic diagram of the frame structure of the method of sending synchronization signals of this embodiment. As shown in FIG. 3, in LTE system, a 10 ms radio frame is divided into two half-frames, each of which is divided into ten time slots equally of a length of 0.5 ms, and every two time slots forms a sub-frame of a length of 1 ms, thus the radio frame includes ten sub-frames (numbered from 0 to 9) and the radio frame includes twenty time slots (numbered from 0 to 19). In a normal cyclic prefix, one sub-frame comprises fourteen OFDM symbols, assuming that the DwPTS comprises four OFDM symbols and the period of uplink/downlink switching is 5 ms, then the P-SCH signals are sent in the third symbol of the DwPTS, and the S-SCH signals are sent in the last OFDM symbols of the time slot 1 and the time slot 11.

It should be noted that, for a convenient description, step numbers have been used when the method is described, but it should not be considered to limit the scope of the present invention. For example, there is no limitation on the sequence of sending P-SCH signals and S-SCH signals, which can be flexibly configured depending on implementation requirements. In addition, as for the symbol configuration for sending P-SCH and S-SCH signals, the present invention is not limited to the method provided in the embodiment mentioned above, another implementation method will be described in the following Embodiment 2.

Method Embodiment 2

Figure 4:
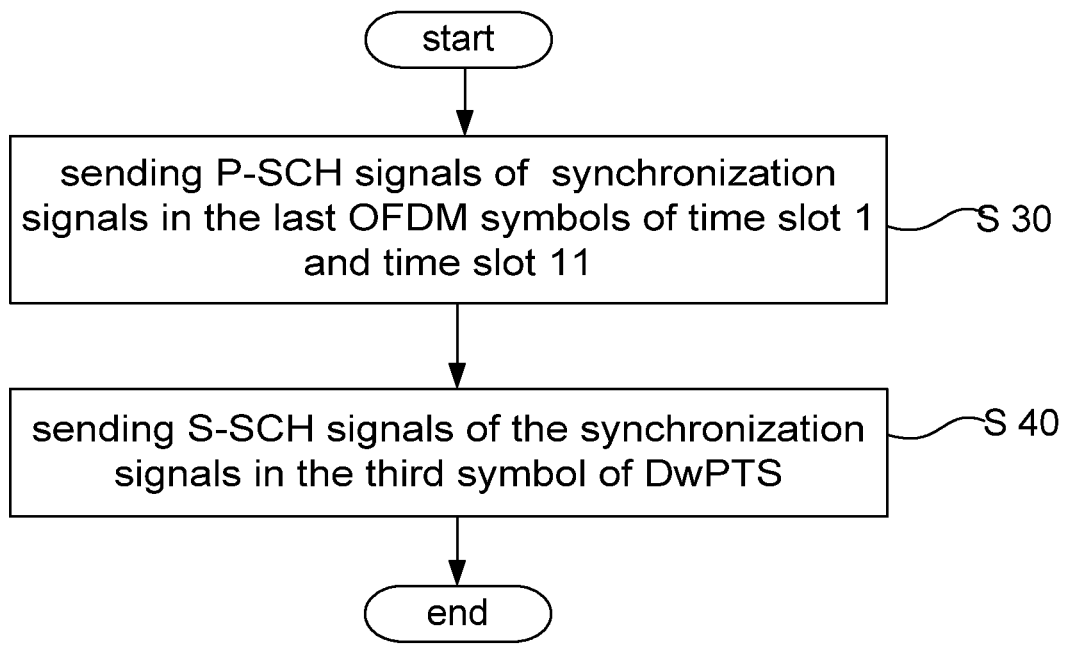
FIG. 4 is a flow chart of a method of sending synchronization signals according to Method Embodiment 2 of the present invention.

In this embodiment, a method of sending synchronization signals is provided. FIG. 4 is a flow chart of the method of sending synchronization signals according to Embodiment 2 of the present invention. As shown in FIG. 4, the method comprises:

step S30: sending P-SCH signals of synchronization signals on the last OFDM symbols of time slot 1 and time slot 11; and step S40: sending S-SCH signals of the synchronization signals on the third symbol of a DwPTS.

In the method of sending synchronization signals of the foregoing embodiment, there is no pilot sent in the third symbol of the DwPTS, so there will be no influence on the pilot when sending synchronization signals on the symbol, further, it will not be required to change the pilot design in the DwPTS, thus achieving the effects of reducing the system complexity and not influencing the performance of cell searching.

Figure 5:
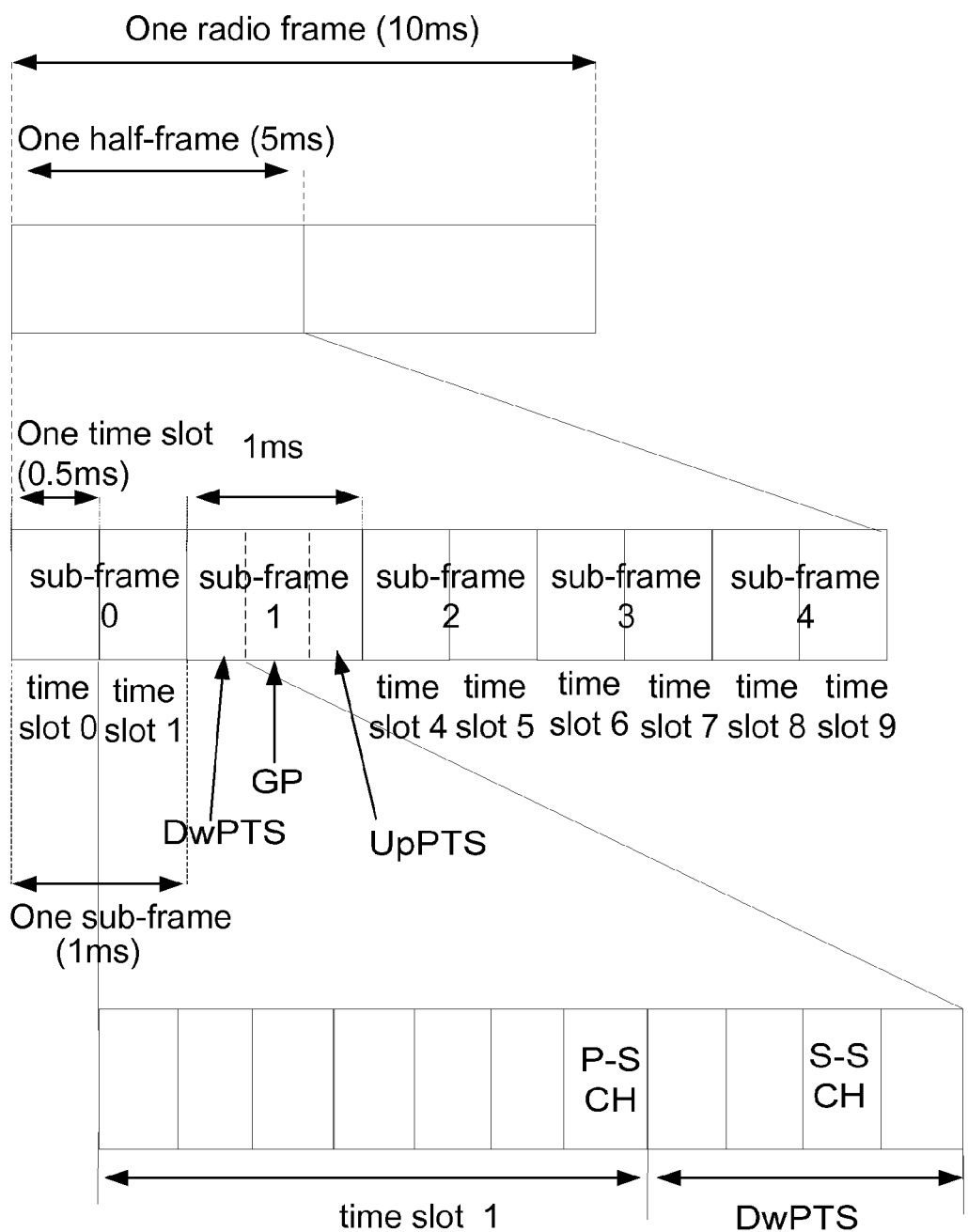
FIG. 5 is a schematic diagram of a frame structure of a method of sending synchronization signals according to Method Embodiment 2 of the present invention.

FIG. 5 is a schematic diagram of the frame structure of the method of sending synchronization signals in this embodiment. In LTE system, a 10 ms radio frame is divided into two half-frames, each of which is divided into ten time slots equally of a length of 0.5 ms, and every two time slots forms a 1 ms sub-frame, thus the radio frame includes ten sub-frames (numbered from 0 to 9) and the radio frame includes twenty time slots (numbered from 0 to 19). In a normal cyclic prefix, one sub-frame comprises fourteen OFDM symbols, assuming that the DwPTS comprises four OFDM symbols and the period of uplink/downlink switching is 5 ms, then the P-SCH signals are sent in the last OFDM symbols of the time slot 1 and the time slot 11, and the S-SCH signals are sent in the third symbol of the DwPTS.

Apparatus Embodiment 1

Figure 6:
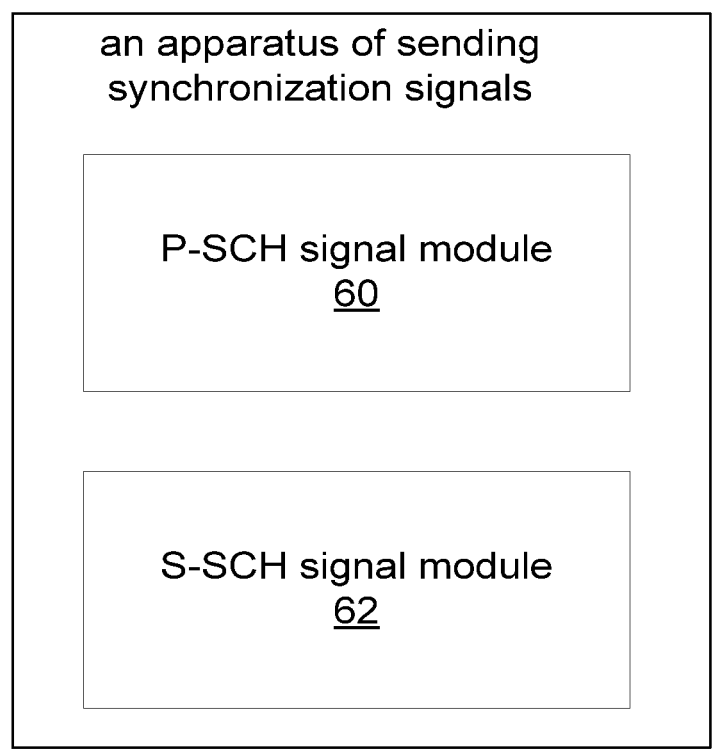
FIG. 6 is a block diagram of an apparatus of sending synchronization signals according to Apparatus Embodiment 1 of the present invention.

In this embodiment, an apparatus of sending synchronization signals in TDD systems is provided, which can be used to realize the method mentioned in Method Embodiment 1. FIG. 6 is a block diagram of the apparatus of sending synchronization signals according to Method Embodiment 1 of the present invention. As shown in FIG. 6, this apparatus comprises:

P-SCH signal module 60, which is used to send the P-SCH signals of the synchronization signals on the third symbol of the DwPTS; and S-SCH signal module 62, which is used to send the S-SCH signals of the synchronization signals on the last OFDM symbols of the time slot 1 and the time slot 11.

Apparatus Embodiment 2

In this embodiment, an apparatus of sending synchronization signals in TDD systems is provided, which is used to realize the method mentioned in Method Embodiment 2. This apparatus comprises: a P-SCH signal module, which is used to send the P-SCH signals of the synchronization signals on the last OFDM symbols of the time slot 1 and the time slot 11; and an S-SCH signal module, which is used to send the S-SCH signals of the synchronization signals on the third symbol of the DwPTS.

From the above descriptions, it can be seen that: in the methods and apparatuses of sending synchronization signals of the foregoing embodiments in the present invention, a change has been made on the location for sending synchronization signals in the prior art, which simplifies the design of the pilot and control channel in the DwPTS, guarantees that the location of the pilot in the DwPTS does not change, and achieves the purpose of reducing the system complexity without influencing the performance of cell searching at the same time.

It is obvious that those skills in the art shall understand that the modules and steps mentioned above in the present invention can be realized with general computing devices, e.g. being integrated into one single computing device or being distributed in a network consisting of multiple computing devices; alternatively, the modules and steps can also be realized with program codes the computing devices capable of executing, thus these modules and steps can be stored in memory devices so as to be executed by the computing devices, or be realized by being made into respective integrated circuit modules, or a plurality of the modules or steps therein can be made into a single integrated circuit module so as to be realized. In this way, the present invention is not limited to any particular combination of hardware and software.

The above descriptions are just preferred embodiments of the present invention, and not used to limit the present invention. To those skilled in the art, a variety of modifications and changes may be made on the present invention. Any modification, equivalent substitute and improvement, etc. without departing from the spirit and principles of the present invention shall be included within the protection scope of the present invention.

What is claimed is:

1. A method of sending synchronization signals in TDD systems, comprising:

sending primary-synchronization (P-SCH) signals of synchronization signals on the third symbol of a downlink pilot time slot (DwPTS);

sending secondary-synchronization (S-SCH) signals of the synchronization signals on the last OFDM symbols of time slot 1 and time slot 11; and wherein, communicating the P-SCH signals and the S-SCH signals by means of the TDD systems according to the sending.

2. A method of sending synchronization signals in TDD systems, comprising:

sending P-SCH signals of synchronization signals on the last OFDM symbols of time slot 1 and time slot 11;

sending S-SCH signals of the synchronization signals on the third symbol of a DwPTS; and wherein, communicating the P-SCH signals and the S-SCH signals by means of the TDD systems according to the sending.

3. An apparatus of sending synchronization signals in TDD systems, comprising:

a P-SCH signal module in an integrated circuit, which is used to send P-SCH signals of synchronization signals on the third symbol of a DwPTS; and an S-SCH signal module in an integrated circuit, which is used to send S-SCH signals of the synchronization signals on the last OFDM symbols of time slot 1 and time slot 11.

4. An apparatus of sending synchronization signals in TDD systems, comprising:

a P-SCH signal module in an integrated circuit, which is used to send P-SCH signals of synchronization signals on the last OFDM symbols of time slot 1 and time slot 11; and an S-SCH signal module in an integrated circuit, which is used to send S-SCH signals of the synchronization signals on the third symbol of a DwPTS.

* * * * *